United States Patent Office 2,764,479
Patented Sept. 25, 1956

2,764,479

HERBICIDES

Everett E. Gilbert, Morris County, N. J., assignor to Allied Chemical & Dye Corporation, New York, N. Y., a corporation of New York No Drawing. Application March 28, 1955,
Serial No. 497,460

17 Claims. (Cl. 71—2.7)

The present invention relates to new herbicides and to methods for combatting undesired vegetation in which such herbicides are employed.

The prior art discloses various types of herbicides, each of which is more or less suited for the control of a particular weed or group of weeds. Some herbicides are best adapted for control of weeds in agricultural lands where damage to emerged crop plants must be avoided. In other cases, it may be desired merely to kill or check development of undesired vegetation by pre-emergent application to planted fields of herbicides which do not create sustained herbicidal properties in the soil or otherwise affect production and development of the desired crop. In still other cases, complete kill of all vegetation is the desired objective. For each type of herbicide application it has been very difficult to achieve economically effective control of resistant emerged plant structures, particularly certain grasses and certain plants which propagate by or through their root systems, especially when such systems penetrate deeply into the soil.

Many of the broadleaf or dicotyledonous varieties of plants which commonly grow wild in open fields, along railroad tracks, roads and fringes of woodland, may be controlled to some extent by herbicides known and on the market. However, considerable difficulty is characteristic of destruction of the more pernicious monocotyledonous plants or grasses such as Johnson grass which also commonly appear in the aforementioned areas. Johnson grass, for example, has plagued cotton planters for many years and has resisted efforts to control it. It crowds out the cotton, drinks up tons of water and clogs irrigation ditches. Heretofore, the herbicides used proved either ineffective or too expensive and destructive to the cotton for practical use. Some compounds did a fair job of killing the Johnson grass but made the soil sterile for at least 10 years. In desperation, researchers finally advised farmers to try starving the weed out for 2 years by summer fallowing and plowing every ten days.

Further, achieving lethal effect on subterranean plant roots which may be buried several inches or even a foot or more below the surface of the ground is usually quite difficult and often not practicable, even in the case of the more susceptible dicotyledonous plants. Destruction of the roots is important in preventing resprouting of the root nodes after the herbicide has been washed away by rainfall or otherwise dissipated. In much the same manner as the nodes on the live roots, seedlings which survive initial treatment usually sprout after the herbicidal effect has been dissipated and soil and atmospheric conditions are favorable. In order to obtain substantially complete and long-lasting plant control with ordinary herbicides, use of uneconomical amounts of herbicides has been necessary.

The purpose of the present invention is to provide herbicides and processes for their use whereby extensive and long-lasting control of undesired vegetation may be realized, e. g. killing of plant roots and, for a prolonged period of time after original application, killing of seedlings at or soon after sprouting of the seeds, particularly in the case of the more refractory monocotyledonous plants.

According to the present invention, the above objects may be obtained by use of a member of the group consisting of hexachloroacetone, pentachloroacetone and mixtures of the same. These herbicides kill plant roots at substantial depths below the ground surface, kill or seriously inhibit growth of seedlings and are generally characterized by cumulative phytotoxic action.

The aforementioned herbicides, under normal temperatures, are non-corrosive, non-volatile, and non-inflammable liquids, substantially insoluble in water but soluble in many organic solvents, particularly hydrocarbon oils. These highly advantageous physical properties of the present herbicides, together with their cheapness and herbicidal effectiveness, combine to fill a need in the weed killing art.

The herbicides of the present invention are cheaply prepared by the direct chlorination of trichloroacetones in accordance with U. S. P. 2,635,117, issued April 14, 1953, to Cyril Woolf and Everett E. Gilbert. Among the products of this patent are crude materials containing hexachloroacetone, pentachloroacetone and high boiling by-products. Such materials may be used "as is" or may be further purified before use in the present invention.

In the less preferred embodiments of this invention, the herbicide may be applied directly, as by spraying, to the vegetation to be treated. However, for reasons of economy and to achieve greater uniformity of application, it is preferred to disperse the herbicide in a suitable dispersion medium prior to its application. Since the present herbicides are soluble in many organic solvents such as methanol, isopropanol, monochlorobenzene, trichlorobenzene and hydrocarbon oils, but insoluble in water, I prefer to disperse them in such organic solvents. A petroleum fuel oil having a viscosity of about 40 Saybolt seconds at 100° F., a pour point of about 10° F. and a distillation range of about 10 percent over at 440° F. and 90 percent over at 600° F. has been found to be highly economical and otherwise suitable. However, hydrocarbon or other organic solvents may be utilized, primary considerations being solubility of the herbicide therein, economy and availability. If desired, organic solvents which are themselves herbicides may be employed. Other feasible methods of dispersing the present herbicides include first forming a solution thereof in a suitable hydrocarbon or other organic solvent material and thereafter emulsifying the solution in water or aqueous medium with a suitable emulsifying agent and wetting agent, if desired. An alternative method for dispersing the herbicides which may be mentioned includes forming an emulsion of the herbicide directly with water or aqueous solution. Further the herbicide may be impregnated on suitable solid powdered diluent. In the latter case, about 5 to 50% by weight of the herbicide is impregnated on a finely-divided diluent such as diatomaceous earth, wood flours and silica gels, with or without addition of small quantities of wetting agents. This herbicidal material may be used as a dust or water-dispersible powder. Any of the known types of spraying or dusting apparatus may be employed for applying the herbicide to the area to be treated, a primary consideration being uniformity of application.

The concentration of herbicide in the dispersion medium is maintained sufficiently high to bring about the desired control of vegetation. If concentrations are exceedingly low, excessive volumes of the herbicidal solution may be required to achieve desired plant killing effect. The attendant disadvantage of possible poor economy due to run-off and cost of dispersion medium is obvious, and affords a practical low limit on concentration of herbicide in the mixture. I found that particularly outstanding results have been obtained by employing about 1/64 to 1/16 of a volume of herbicide for each volume of dispersion medium. However, as low as 1/256 of a volume of the herbicide per volume of dispersion medium has been successfully used.

The herbicides of my invention are applied to the area to be treated in amount (pounds per acre) sufficient to afford the degree of control of vegetation desired in the given area. The optimum intensity of application of the herbicide will depend on such factors as amount of vegetation in the area, degree of permanency of plant eradication desired, type of plants growing in the area and climatic conditions. Hence, as is well known to those skilled in the art, the rate of application actually used will depend largely on prevailing local conditions. In most instances, effective control of germinating weed seeds and small weed seedlings may be realized by applying the herbicide at an overall rate greater than about 5 pounds per acre. Where prolonged non-selective control of established vegetation is desired, dosages greater than about 50 pounds per acre are employed.

As indicated above, the herbicides of the present invention are particularly effective in controlling monocotyledonous plants, which plants are generally highly pernicious and refractory to ordinary herbicides. However, the herbicides are also lethal to dicotyledonous plants. Accordingly, by use of the herbicides of this invention effective and lasting control of both monocotyledonous and dicotyledonous plants may be obtained.

The following examples are illustrative of practice of the invention.

*Example 1.*—A test plot was covered with buffalo grass, panicum grass, poison ivy, milkweed, horehound, wiregrass and ragweed seedlings of established growth. Hexachloroacetone was dissolved in No. 2 fuel oil as dispersant (a commercial fuel oil having a viscosity of 40 Saybolt seconds at 100° F., a flash point of 150° F. and a pour point of about 10° F., and distilling 10 percent over at 440° F. and 90 percent over at 600° F.) and was applied to the vegetation as uniformly as practicable with a knapsack sprayer. The amount of hexachloroacetone in the applied composition was equivalent to 51.1 pounds per acre. Examination of the plot 17 days after spraying showed effective weed and grass control.

*Example 2.*—A solution of hexachloroacetone in Hi-Solv 473 (a commercial aromatic hydrocarbon solvent) was sprayed at the rate of 54 pounds of toxicant per acre on a plot of freshly mowed grassland in September. Weed growth comprised rye grass, blue grass, broadleaf plantain, narrowleaf plantain, wild onion, carrot, potato and strawberry. 11 days after application inspection of the plot showed that it was 95 percent "browned out." 26 days later the plot was still 95 percent "browned out" and few of the original weeds were still present. The land was then allowed to "overwinter," next being observed on the following April 15. A 50 percent inhibition of regrowth was noted.

*Example 3.*—A plot containing nut grass was sprayed liberally with a 1:24 (volume:volume) solution of hexachloroacetone in Varsol 1 (a commercial refined aliphatic hydrocarbon solvent). The toxicant translocated to the roots of the plant and killed the "nuts" from which the plant grew.

*Example 4.*—A solution of hexachloroacetone in Hi-Solv 473 was sprayed on planted soil as pre-emergent application at the rate of 18 pounds per acre of toxicant two days after planting seeds of cotton in test plots. At the time of spraying the plots also contained broadleaf weed and grass seeds and seedlings. Observation of the test plots three weeks after spraying showed that despite strong phytotoxic effect of hexachloroacetone upon the germinating seeds and seedlings of the broadleaf weeds and grass, its action in this regard was selective and did not extend to the valuable crop, cotton.

*Example 5.*—Clumps of one year old Johnson grass infesting a plot of cotton plants 3 to 5 inches in height were individually sprayed with a 1:32 (volume:volume) solution of hexachloroacetone in Varsol 1 at an overall rate equivalent to about 20 pounds of hexachloroacetone per acre. As a result of this single application, 80 to 90% of the Johnson grass plants were killed, rootstocks and all. The application of the hexachloroacetone had no immediate effect on the cotton plants, and only a mild, negligible effect occurred after rain.

In this example there is shown the selective exclusion of cotton plants from the phytotoxic action of hexachloroacetone, while this substance effectively controls a weed, present with the cotton, which has demonstrated extreme resistance to herbicides.

*Example 6.*—Clumps of Johnson grass at least two years old were individually sprayed with a 1:32 (volume:volume) solution of pentachloroacetone in Varsol 1. One week after application it was observed that the stem population decreased 81.2%.

*Example 7.*—Clumps of Johnson grass at least two years old were individually sprayed with a 1:32 (volume:volume) solution of crude hexachloroacetone in kerosene. The crude material contained 90% hexachloroacetone, 6.5% pentachloroacetone and 3.5% high boiling fraction. One week after application it was observed that the stem population decreased 90.5%.

In the above examples some of the dispersion mediums employed are so-called "herbicidal oils." However, a single application of one of these oils alone has usually been found to have only a transitory effect with respect to plant tops and rarely, if ever, any substantial effect on the vitality and persistence of the plants as a whole.

Since various changes and modifications may be made without departing from the spirit thereof, the invention is to be taken as limited only by the scope of the appended claims.

This application is a continuation-in-part of my copending application Serial No. 418,220, filed March 23, 1954, now abandoned.

I claim:

1. A herbicidal composition comprising a member of the group consisting of hexachloroacetone, pentachloroacetone and mixtures thereof in a hydrocarbon oil as dispersion medium, said member being present in phytotoxic concentration.

2. A herbicidal composition comprising hexachloroacetone in a hydrocarbon oil as dispersion medium, said hexachloroacetone being present in phytotoxic concentration.

3. A herbicidal composition comprising a member of the group consisting of hexachloroacetone, pentachloroacetone and mixtures thereof in a petroleum oil as dispersion medium, said member being present in phytotoxic concentration.

4. A herbicidal composition comprising hexachloroacetone in a petroleum oil as dispersion medium, said hexachloroacetone being present in phytotoxic concentration.

5. The method of combatting growth of undesired vegetation which comprises treating said vegetation with a member of the group consisting of hexachloroacetone, pentachloroacetone and mixtures thereof in amount sufficient to cause deterioration of said vegetation.

6. The method of combatting growth of undesired vegetation which comprises treating said vegetation with hexachloroacetone in amount sufficient to cause deterioration of said vegetation.

7. The method of combatting growth of undesired vegetation which comprises applying to said vegetation a member of the group consisting of hexachloroacetone, pentachloroacetone and mixtures thereof dispersed in a dispersion medium, the amount of said member so applied being sufficient to cause deterioration of said vegetation.

8. The method of combatting growth of undesired vegetation which comprises applying to said vegetation hexachloroacetone dispersed in a dispersion medium, the amount of hexachloroacetone so applied being sufficient to cause deterioration of said vegetation.

9. The method of combatting growth of undesired vegetation which comprises applying to said vegetation a member of the group consisting of hexachloroacetone, pentachloroacetone and mixtures thereof in hydrocarbon oil solvent, the amount of said member so applied being sufficient to cause deterioration of said vegetation.

10. The method of combatting growth of undesired vegetation which comprises applying to said vegetation a member of the group consisting of hexachloroacetone, pentachloroacetone and mixtures thereof in petroleum oil solvent, the amount of said member so applied being sufficient to cause deterioration of said vegetation.

11. The method which comprises the pre-emergent treatment of soil in which cotton has been planted with a member of the group consisting of hexachloroacetone, pentachloroacetone and mixtures thereof in amount sufficient to control the growth of weeds selectively with respect to the cotton.

12. The method which comprises the pre-emergent treatment of soil in which cotton has been planted with hexachloroacetone in amount sufficient to control the growth of weeds selectively with respect to the cotton.

13. The method which comprises treatment of weeds in emerged cotton with a member of the group consisting of hexachloroacetone, pentachloroacetone and mixtures thereof in amount sufficient to control the growth of the weeds selectively with respect to the cotton.

14. The method which comprises treatment of weeds in emerged cotton with hexachloroacetone in amount sufficient to control the growth of the weeds selectively with respect to the cotton.

15. A herbicidal composition comprising a member of the group consisting of hexachloroacetone, pentachloroacetone and mixtures thereof and a diluent therefor, said member being present in phytotoxic concentration.

16. A herbicidal composition comprising a member of the group consisting of hexachloroacetone, pentachloroacetone and mixtures thereof in an aqueous dispersion, said member being present in phytotoxic concentration.

17. A herbicidal composition comprising a member of the group consisting of hexachloroacetone, pentachloroacetone and mixtures thereof and a solid powdered diluent therefor, said member being present in phytotoxic concentration.

References Cited in the file of this patent

UNITED STATES PATENTS

| 2,635,117 | Woolf et al. | Apr. 14, 1952 |

FOREIGN PATENTS

| 740,232 | France | Nov. 12, 1932 |
| 122,159 | Sweden | Aug. 27, 1946 |